(12) United States Patent
Forman et al.

(10) Patent No.: US 8,260,730 B2
(45) Date of Patent: Sep. 4, 2012

(54) METHOD OF, AND SYSTEM FOR, CLASSIFICATION COUNT ADJUSTMENT

(75) Inventors: George H. Forman, SE Port Orchard, WA (US); Henri Jacques Suermondt, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1501 days.

(21) Appl. No.: 11/080,098

(22) Filed: Mar. 14, 2005

(65) Prior Publication Data

US 2006/0206443 A1   Sep. 14, 2006

(51) Int. Cl.
*G06N 5/00* (2006.01)
(52) U.S. Cl. ............................ 706/20; 706/45
(58) Field of Classification Search ............ 706/20, 706/25, 45; 435/6
See application file for complete search history.

(56) References Cited

U.S. PATENT DOCUMENTS

| | | | | |
|---|---|---|---|---|
| 5,333,184 | A | * | 7/1994 | Doherty et al. .......... 379/115.01 |
| 5,452,399 | A | * | 9/1995 | Moed .............................. 706/20 |
| 5,638,491 | A | * | 6/1997 | Moed .............................. 706/20 |
| 5,664,067 | A | * | 9/1997 | Moed et al. ..................... 706/25 |
| 5,930,803 | A | | 7/1999 | Becker et al. |
| 5,989,811 | A | * | 11/1999 | Veltri et al. ................... 435/6.14 |
| 6,301,579 | B1 | | 10/2001 | Becker |
| 6,460,049 | B1 | | 10/2002 | Becker et al. |
| 6,728,690 | B1 | | 4/2004 | Meek et al. |
| 2004/0148330 | A1 | | 7/2004 | Alspector et al. |

* cited by examiner

*Primary Examiner* — Wilbert L Starks

(57) ABSTRACT

A classification count adjustment system for adjusting a count estimate of items in a dataset D classified into a class is disclosed. The system includes a count estimate produced by a classifier of the number of items in the dataset D classified into the class. The system further comprises one or more measures of behavior of the classifier, indicating the ability of the classifier to classify items into the class. The system further comprises a processor for computing an adjusted estimate based on the count estimate by the classifier and the one or more measures of behavior.

35 Claims, 6 Drawing Sheets

302 Obtain a calibration dataset T

304 Apply classifier to items in the calibration dataset T

306 Tally whether classifier correctly assigns items to class C or class C complement 308 Compute one or more measures of behavior of classifier

METHOD OF, AND SYSTEM FOR, CLASSIFICATION COUNT ADJUSTMENT

FIELD

The present invention relates, generally, to the field of classification and, more particularly, to a method of, and a system for, classification count adjustment.

BACKGROUND

In order to extract estimates of the size of subsets of data from a dataset, an automated classifier may be used that predicts which of the data items belong to a particular subset of interest. As an example an automated classifier may be used to estimate how many documents in a business news wire are related to a particular company of interest. Another example is where a news company uses a classifier to determine under which major topic each incoming news article should be filed. In order to determine the percentage of articles filed under one particular category last year, one could count how many articles were predicted by the classifier to belong in this category. This is advantageous so that the relative level of interest in a particular topic can be tracked. Once the classifier has determined which topic a particular article should reside in, the results of the automated categorization are then aggregated to give overall estimates of the number of articles in each category area. These results are then used to report to media relations teams.

Another application of automated classifiers includes estimating how many genes in a database are predicted to exhibit some property. It can be extremely important to scientists and business analysts to obtain the best possible estimates.

In the field of machine learning, trained classifiers may be used for the purpose of counting how many items in a new (unlabeled) batch fall into several classes. In such applications the actual counts are of particular interest rather than the individual classifications of each item.

A problem with the present automated classifiers is that, in practice, the automated classifiers that assign items or subsets of data to categories make mistakes. Of primary concern in this invention is the actual number of items in a particular category and not so much what each item assigned to the category involves. In other words, it is advantageous to know how frequent a particular category is without necessarily knowing about the category of any particular record. The mistakes made by the classifier do not always cancel one another out (so-called false positives being offset by so-called false negatives) as the misclassifications made by automatic classifiers may skew the observed frequency of items assigned by the classifier to a category either way (from what the frequency actually should be if all items were assigned correctly) depending on the calibration and training of the classifier. This results in bias in the estimate of the size of a category of interest.

SUMMARY

A classification count adjustment system for adjusting a count estimate of items in a dataset classified into a class is disclosed. The system includes a count estimate produced by a classifier of the number of items in the dataset classified into the class and one or more measures of behavior of the classifier indicating the ability of the classifier to classify the items into the class. Furthermore the system includes a processor for computing an adjusted estimate based on the count estimate by the classifier and the one or more measures of behavior.

DETAILED DESCRIPTION OF THE EXEMPLARY EMBODIMENT

Figure 1A:
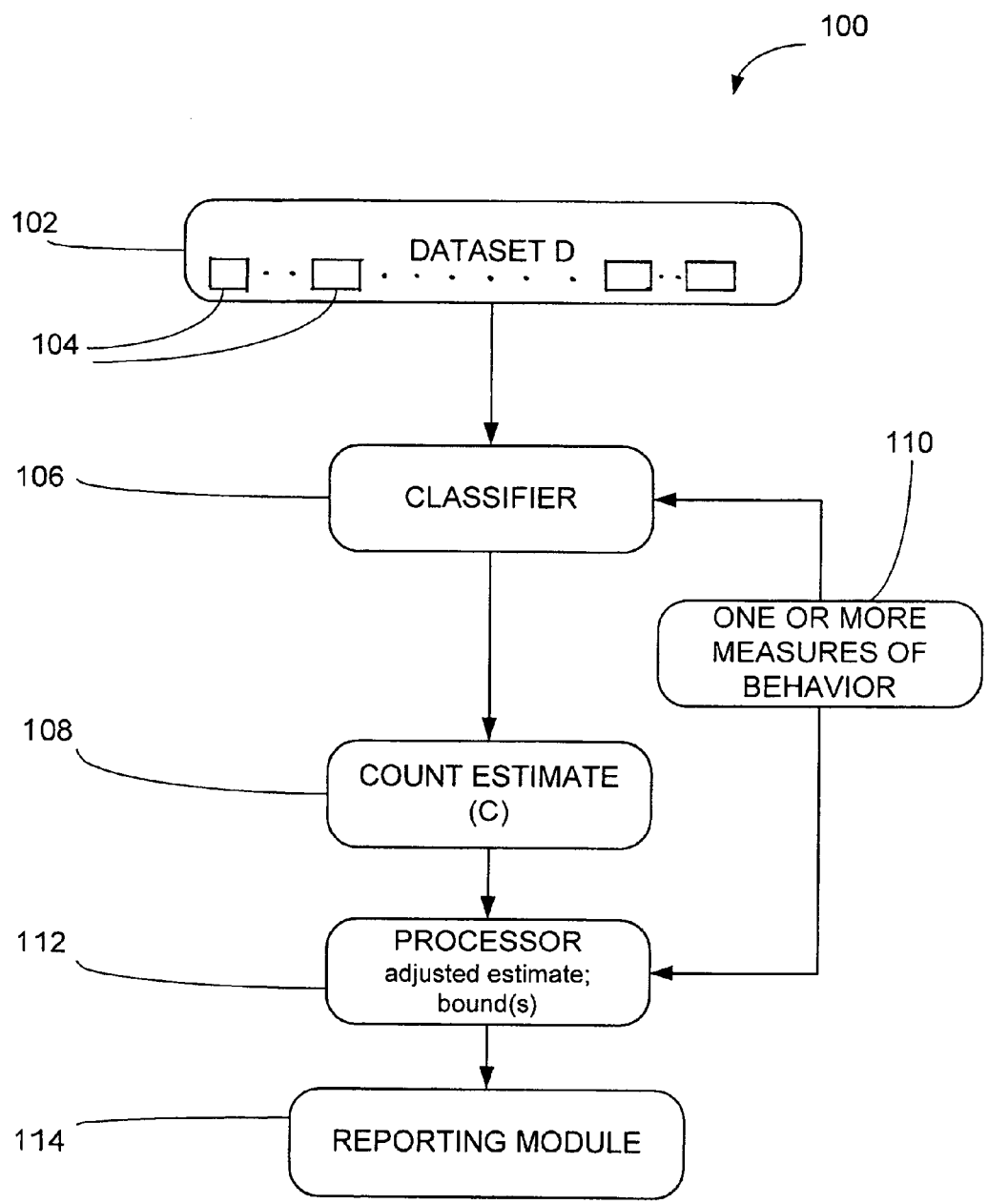
FIG. 1A is a schematic diagram of components of a classification count adjustment system according to an embodiment of the invention.

In FIG. 1A, reference numeral 100 generally designates a classification count adjustment system, in accordance with an embodiment, for adjusting a count estimate of items in a dataset D classified into a class. The system 100 adjusts a count estimate 108 provided by a classifier 106 of a number of items 104 in dataset 102 classified into a class C. Thus the classifier 106 is applied to the items 104 in the dataset 102 and then counts the number of items 104 in dataset 102 that are classified in the class C, to produce the count estimate.

One or more measures of behavior 110 of the classifier 106 are used to indicate the ability of classifier 106 to classify the items 104 into class C. Examples of the measures include a true positive rate (TPR) and a false positive rate (FPR). One way to obtain a true positive rate of a classifier for class C, denoted as TPR(C) is to calculate (given a set of items for which it is known whether they truly belong to class C) the fraction of these items assigned to class C out of all the items that should have been assigned to class C. In other words, TPR(C)=(# items classified into class C that are truly in class C/# items truly belonging to class C) where classifications are made by the classifier 106. TPR(C) is also known as a recall of the classifier for class C. One way to obtain a false positive rate of a classifier for class C, denoted as FPR(C) for the classifier, is to calculate (given a set of items for which it is known whether they truly belong to class C) the fraction of these items that were wrongly assigned (by the classifier) to class C out of all the items not belonging in class C. In other words, FPR(C)=(# items classified into class C that are truly not in class C/# items that are truly not in class C), where classifications are made by the classifier 106.

The classifier 106 is applied to each item 104 of the dataset 102 which then provides the count estimate 108 for class C. One way in which the classifier 106 can provide the count estimate is by counting, or tallying, the number of items 104 in the dataset 102 assigned to class C by the classifier 106. Finally a processor 112 computes an adjusted estimate for class C based on the one or more measures of behavior 110 and the count estimate 108. An adjusted count estimate is then provided by reporting module 114.

Figure 1B:
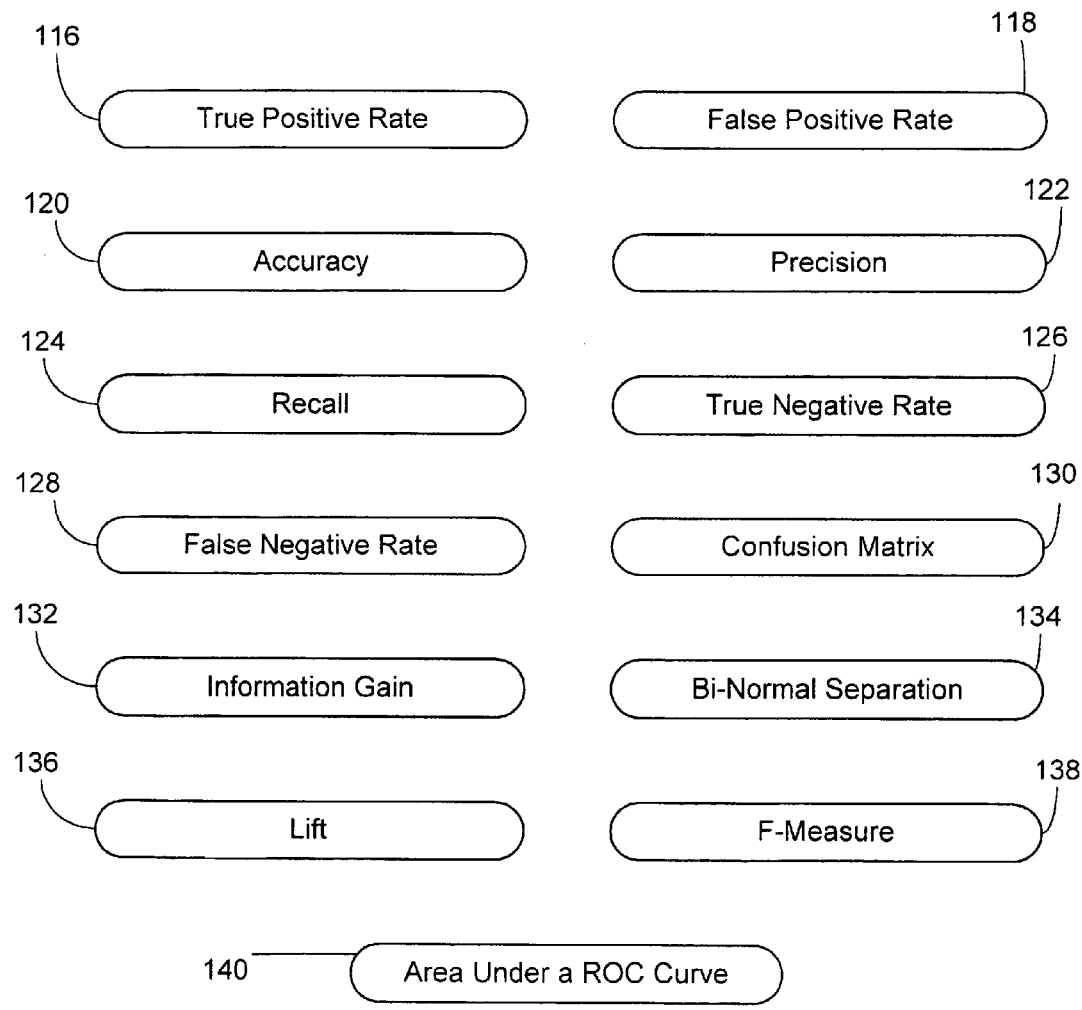
FIG. 1B is a schematic diagram showing examples of measures of behavior of a classifier according to an embodiment of the invention.

Apart from a true positive rate 116 and a false positive rate 118, other measures of behavior of the classifier 106 are shown in FIG. 1B and include an accuracy 120, a precision 122, a recall 124, a true negative rate 126, a false negative rate 128, a confusion matrix 130, an information gain 132, a bi-normal separation 134, a lift 136, an F-measure 138, and an area under an ROC curve 140. Additional measures of behavior of classifiers may be obtained, including permutations of those measures mentioned above. The methods by which all of these measures are to be computed are known to those persons skilled in the art.

Figure 1C:
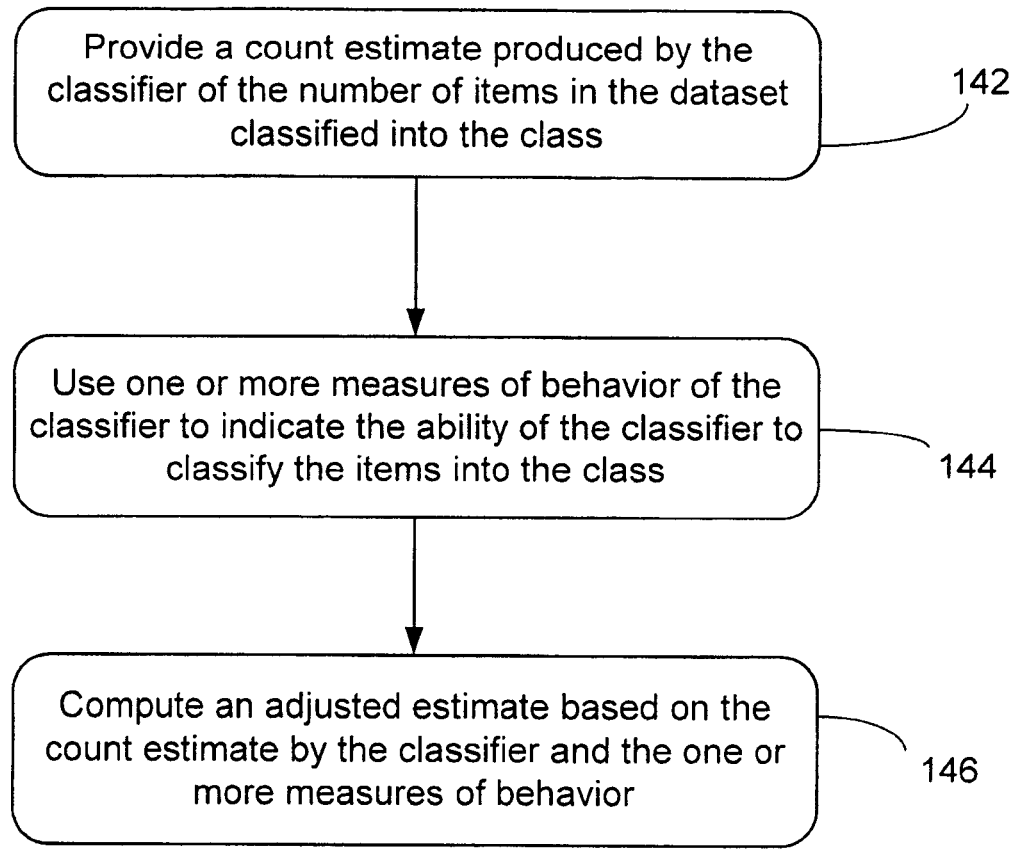
FIG. 1C is a flow diagram showing a method of adjusting a count estimate of items in a dataset classified in a class according to an embodiment.

FIG. 1C shows a flow diagram of a method of adjusting a count estimate 108 of items 104 in a dataset 102 classified in a class. The method includes providing the count estimate 108 produced by classifier 106 of the number of items 104 in the dataset 102 classified into the class at step 142. Then at step 144, one or more measures of behavior 110 of the classifier 106 are used to indicate the ability of the classifier 106 to classify the items 104 into the class. At step 146, the adjusted estimate is computed based on the count estimate 108 by classifier 106 and the one or more measures of behavior 110.

A computer program is used to control a computer to adjust the count estimate 108 of items 104 in dataset 102 classified in a class. The computer program is operable to control the computer to carry out the method steps 142, 144 and 146 above.

The result of applying the classifier 106 to the dataset 102 is a tally or count estimate produced by the classifier 106 of the number of items 104 out of the dataset 102 that are classified into the class C.

The processor 112 then computes an adjusted estimate based on the count estimate and the one or more measures of behavior of the classifier. The exemplary manner in which the processor 112 computes the adjusted estimate is by the following formula:

$$\text{Adjusted Estimate} = (\text{Count estimate} - \text{FPR}(C) * \text{Total}) / (\text{TPR}(C) - \text{FPR}(C))$$

where Total is the total number of items 104 in the Dataset D 102.

As an example the Dataset D 102 consists of 1000 items and the classifier 106 classifies 250 of the items 104 into class C. The count estimate 108 is therefore 250. If it is determined that classifier 106 has a true positive rate of 95% and a false positive rate of 5% then the count estimate 108 of 250 items results in an adjusted estimate of $(250-0.05\times1000)/(0.95-0.05)=222$ items, using the equation defined above for the adjusted estimate. Thus, it can be seen that it is most likely that there are most probably 222 items in class C.

An alternative, approximate manner in which the processor can compute the Adjusted Estimate is as follows:

$$\text{Adjusted Estimate} = \text{Count estimate} * \text{Precision}(C) / \text{Recall}(C).$$

Precision(C) and Recall(C) are measures of behavior of classifiers known to persons skilled in the art and used commonly in the field of data mining.

The reporting module 114 then reports the adjusted estimate.

The processor 112 may also compute estimated bounds (see FIG. 1A) on the various estimates for class C, being a lower bound and an upper bound defined as follows:

$$\text{LowerBound} = \text{count} * \text{Precision}(C)$$

$$\text{UpperBound} = \text{count} / \text{Recall}(C)$$

where count is the count estimate produced by the classifier 106.

Bounds on the Adjusted estimate may be computed in other ways as well, for example by assuming that FPR(C) is equal to zero or that TPR(C) is equal to 1.

The reporting module 114 may report these bounds as LowerBound and Upperbound.

Figures 2, 3:
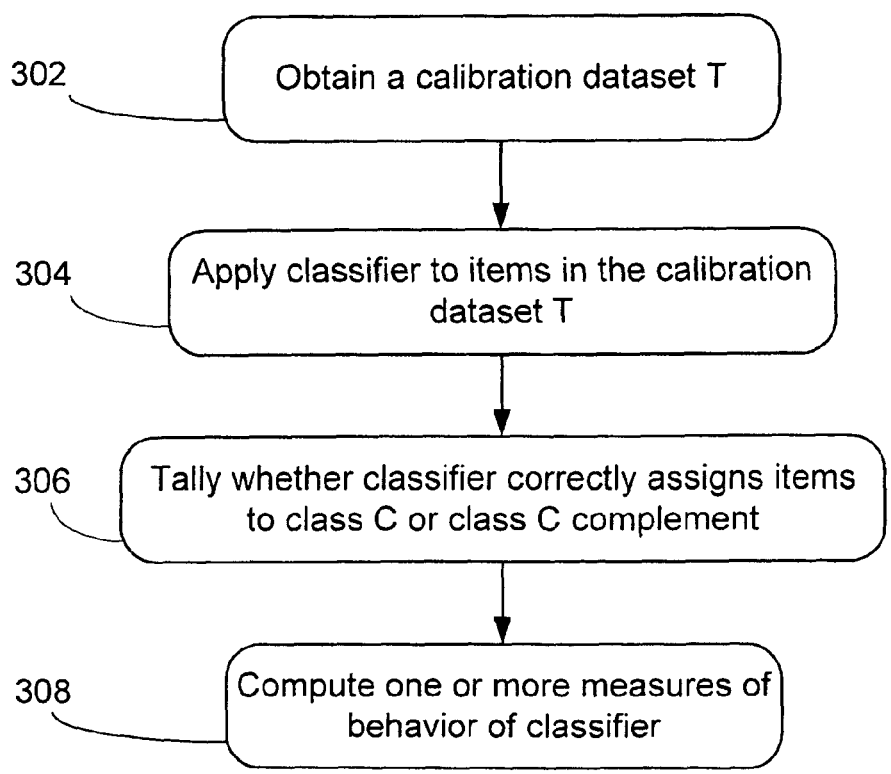
FIG. 2 is an example of a contingency table pertaining to a classifier to estimate a precision and a recall of a classifier according to an embodiment of the invention.
FIG. 3 is a flow diagram showing how to calculate the precision and recall measures from FIG. 2 according to an embodiment of the invention.

As an example the classifier 106 detects 100 items of class C in the data set D 102. If it is determined that classifier 106 has a 97% precision but only 45% recall then the count of 100 items has a lower bound of 97 and an upper bound of 222 with the adjusted estimate being 215 using the equations defined above for the adjusted estimate, lower bound and upper bound. Thus, it can be seen that it is most likely that there are at least 97 items, at most 222 items and most probably 215 items in class C. One manner of obtaining precision and recall measures of behavior of a classifier (given a set of items for which it is known whether they truly belong to class C) is based on the following equations:

Precision=# items classified into class $C$ that are truly in class $C$/# items classified into class $C$ Recall=# items classified into class $C$ that are truly in class $C$/# items truly belonging to class $C$ An example of how the measures of behavior may be calculated is shown with reference to FIG. 2. If classifier 106 has assessed 100 items for which it is known whether they truly should be assigned to class C in the dataset D 102 and it was observed to have the performance as shown in FIG. 2, such that items that were classified in or assigned to class C by the classifier 106 amounted to 13 and items that were not classified in class C amounted to 87. In this 2×2 contingency table it is shown that items that should have been classified in or assigned to class C should have amounted to 10 and those that should not have been classified in class C amounted to 90. From FIG. 2 it is seen that precision equals 8/13 equal to 61.5% and recall equals 8/10 equal to 80%.

Thus when the classifier 106 says "yes", it is in fact incorrect 5/13=38.5% of the time and when the classifier 106 says "no", it is incorrect 2/87=2.3% of the time. Similarly, when the classifier 106 is applied to items that should be assigned to class C, it correctly says "yes" 8/10=80% of the time (the true positive rate) and when the classifier is applied to items that should not be assigned to C, it incorrectly says "yes" 5/90=0.056% of the time (the false positive rate).

With reference to FIG. 3, the measures of behavior may be obtained as follows. In step 302, a calibration set of items is obtained for which it is know whether they should be assigned to class C. For example, this may be determined by a human expert for each item in the calibration set. In step 304, the classifier 106 is applied to each of the items in the calibration set. In step 306, for each item a tally is made whether the classifier 106 correctly or incorrectly assigns the item to class C and whether the item should be assigned to class C. Examples of such tallies are shown in the table in FIG. 2. In step 308, one or more measures of behavior of the classifier 106 are computed based on the resulting tallies.

With the tallies and the positive and negative class count and the actual size of the positive class and the size of the negative class, precision and recall and true positive rate and false positive rate measures can be computed at step 308 based on these figures and these may then be input to the processor 112 in order to obtain the adjusted estimate.

Note that a calibration set of items (such that it is known for the items in the calibration set whether each of the items truly belongs to class C) provides one way to compute one or more measures of behavior of the classifier 106. In contrast, a count estimate 108 can be adjusted by the classification count adjustment system 100 for any dataset 102, regardless of whether it is known for the items 104 in the dataset 102 whether each item truly belongs to class C.

In similar fashion to that described, a complement adjusted estimate may also be calculated by the processor 112 representative of the number of items in the complement of the class which may then be reported by the reporting module 114.

The measures of behavior of the classifier 106 may be obtained by these possibilities:

The measures may be given as an input, for example, provided with the classifier 106 or processor 112.

The measures may be computed by applying a labeled calibration dataset T 402 (FIG. 4), that has each item labeled with the particular class C, to classifier 404 (which is the same as classifier 106 in FIG. 1A). Such calibration dataset T 402 is commonly referred to as a "test set". A record 406 contains an indication as to whether an item in dataset 402 is classified in class C by the classifier 404. Each record 406 is recorded by recording module 410 by applying the classifier 404 to the item. Hence, for the item it is known given the record whether the item is labeled with the particular class C and whether the item is classified in class C by the classifier 404. In this particular case, classifier 404 is applied to each item of calibration dataset T 402. For the class C an evaluation module 408 computes the one or more measures of behavior, such as true positive rate, false positive rate, Precision, and Recall based on the dataset T 402 and the record 406.

Alternatively, the measures of behavior can be computed directly from a confusion matrix by known techniques.

An estimator module 412 may be used for estimating the proportion of items in a population belonging to the class based on the adjusted estimate. The dataset may be a subset of the population and the proportion estimate may be based on the size of the dataset and the size of the population. As an example, with reference to FIG. 1A and FIG. 4, a classifier 106 is presented with a dataset D 102 containing 1,000 items originating from a population of 100,000 items. The count estimate 108 of class C in the dataset D 102 is 120 items. The adjusted count estimate computed by the classification count adjustment system 100 and reported by the reporting module 114 is 140 items. The estimator module 412 estimates that the proportion of the population belonging to class C in the population of 100,000 items is equal to 140/1,000×100%=14%. Based on the size of the population, the estimator module 412 can estimate that the proportion of the population belonging to class C is 14%×100,000=14,000 items.

The measures of behavior can be estimated by known manner cross validation systems which can be performed by the evaluation module 408. This involves a calibration dataset T 402 that has each item labeled with the class, and a learning algorithm A that produced the classifier model M. In ten-fold cross validation, the training dataset T 402 is partitioned into ten equal portions, and, for each of the ten portions P, the algorithm A is applied to the other nine portions to train a classifier M', which is then applied to P and the tallies in a confusion matrix CM are incremented appropriately. Once all ten folds are completed, true positive rate, false positive rate, precision, recall, and other measures of behavior can be computed directly from CM by known manner computations.

Figure 5:
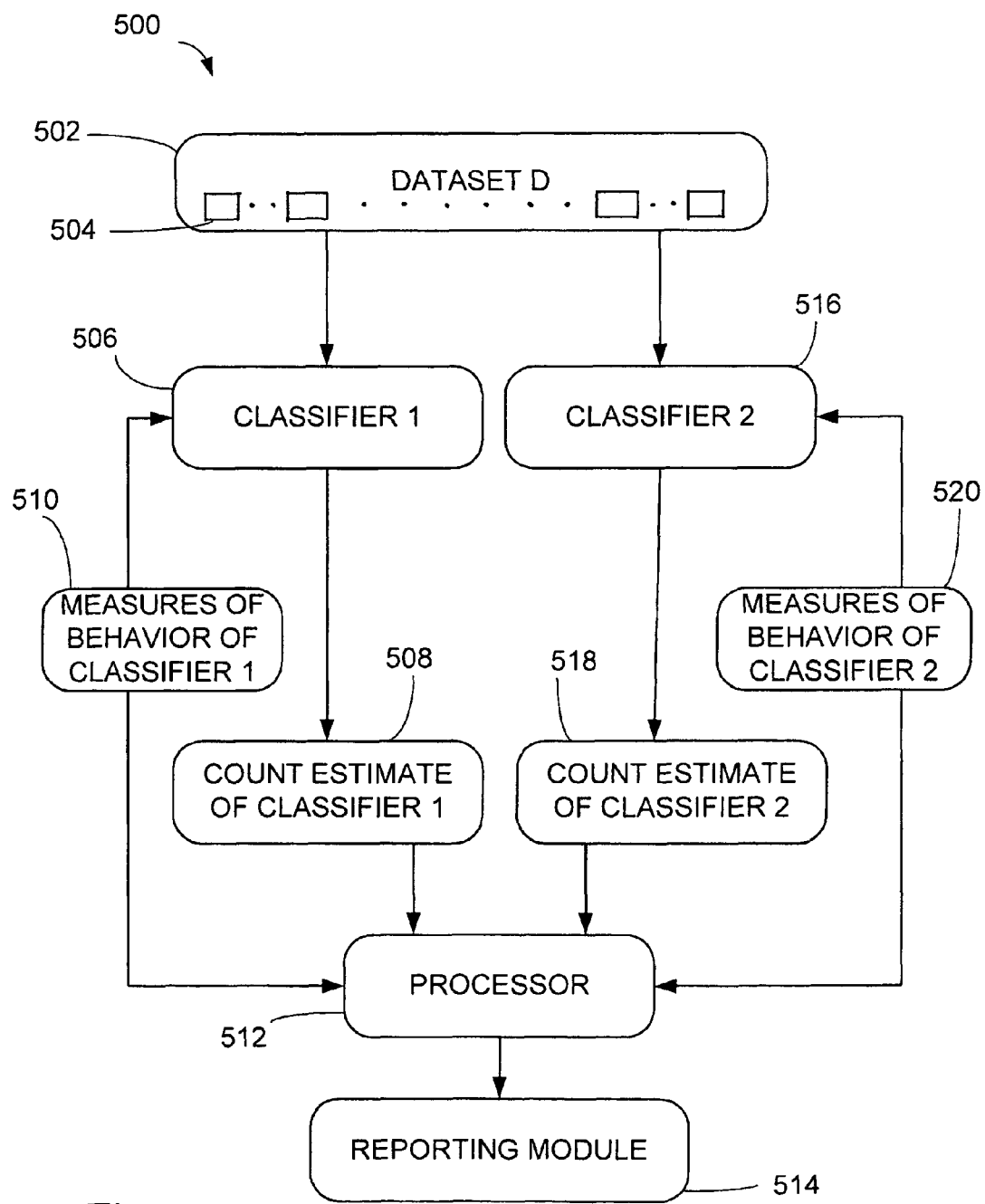
FIG. 5 is a schematic diagram of components of a classification count adjustment system using two classifiers according to another embodiment of the invention.

Referring to FIG. 5, reference numeral 500 generally designates a classification count adjustment system, in accordance with another embodiment, for adjusting a count estimate of items in a dataset D classified into two classes. The system 500 adjusts a count estimate 508 produced by a classifier 506 of a number of items 504 in dataset 502 classified into a first class C1. Thus the classifier 506 is applied to the items 504 in the dataset 502 and then the number of items 504 in dataset 502 that are classified in the class C1 are counted, to produce the count estimate 508. Similarly, the system 500 adjusts a count estimate 518 produced by a second classifier 516 of a number of items 504 in dataset 502 classified into a second class C2. Thus the second classifier 516 is applied to the items 504 in dataset 502 and then counts the number of items 504 in dataset 502 that are classified in the class C2, to produce the count estimate 518.

One or more measures of behavior 510 of the first classifier 506 and one or more measures of behavior 520 of the second classifier 516 are used to indicate the ability of respective classifiers 506 and 516 to classify the items 504 into classes C1 and C2. Examples of the measures include a true positive rate, a false positive rate, a precision and recall. Finally a processor 512 computes an adjusted count estimate for class C1 based on the count estimate 508 and the one or more measures of behavior 510 and computes an adjusted count estimate for class C2 based on the count estimate 518 and the one or more measures of behavior 520. An adjusted count estimate for class C1, for class C2, or for both is then reported by reporting module 514.

The setting of the threshold of the classifier 106 optimizes confidence in the correctness of the adjustment. For example if the classifier 106 considers that an object has a probability of 80% of being a member of class X, it must be decided whether 80% is considered high enough to be called a "positive". This leads to a trade off between true positives and false positives, that is, if the threshold is made higher, there will be fewer false positives but the number of true positives decreases as well as false negatives start to appear and vice versa. An optimal choice of threshold is based on the "cost" of a false positive or a false negative and the value of a true positive or a true negative taking into account the total number of positives and negatives in the population.

The choice of threshold is not critical, as long as knowledge of the trade off, relating to a so-called ROC curve, is substantially accurate. In other words, a threshold can be set according to the judgment of the developer of the classifier, and the measures of behavior of the classifier can be computed accordingly, for example a true positive rate and a false positive rate.

The classification count adjustment will use the resulting measures of behavior of the classifier to improve the estimates. This however is subject to the fact that there is confidence in where the ROC curve truly lies for the population that is being assessed.

If there is uncertainty about the "real" trade off between true positives and false positives, as reflected by a low second-order probability, or if there is some uncertainty as to whether the ROC curve for the true population of interest is represented by that for a particular test set, then the choice of threshold may have a bearing on the accuracy of the results.

Therefore, the "variance" or confidence in different parts of the ROC curve (or, analogously, of a Precision—vs—Recall curve) of the classifier may be assessed. The first part involves smoothness, sensitivity and convexity. An ROC curve is an interpolation of a set of discrete measurements, each reflecting a particular choice of threshold and the resulting numbers of true positives, false negatives, true negatives, and false positives.

The smoothness of the ROC curve is determined by the number of test cases on which the behavior of the classifier 106 is assessed. Given a particular set of test cases and their features and the behavior of the classifier 106, an ROC curve (or a precision-recall curve) shows a trade off between the two axes. In the case of a single test set, this curve is plotted as follows:

Order all data points in the test set in terms of their classifier score and draw the curve accordingly, assuming that the threshold can be set between any pair of adjacent points. In that case, a natural extension is to pick a threshold that reflects a point on the convex hull of this step curve, which is regarded as an optimal surface. Another extension is to pick the threshold in an insensitive area, that is an area where the classifier scores of adjacent points are far apart so it takes substantial changes in the threshold to make cases go from a true positive to a false negative or from a true negative to a false positive.

Figure 4:
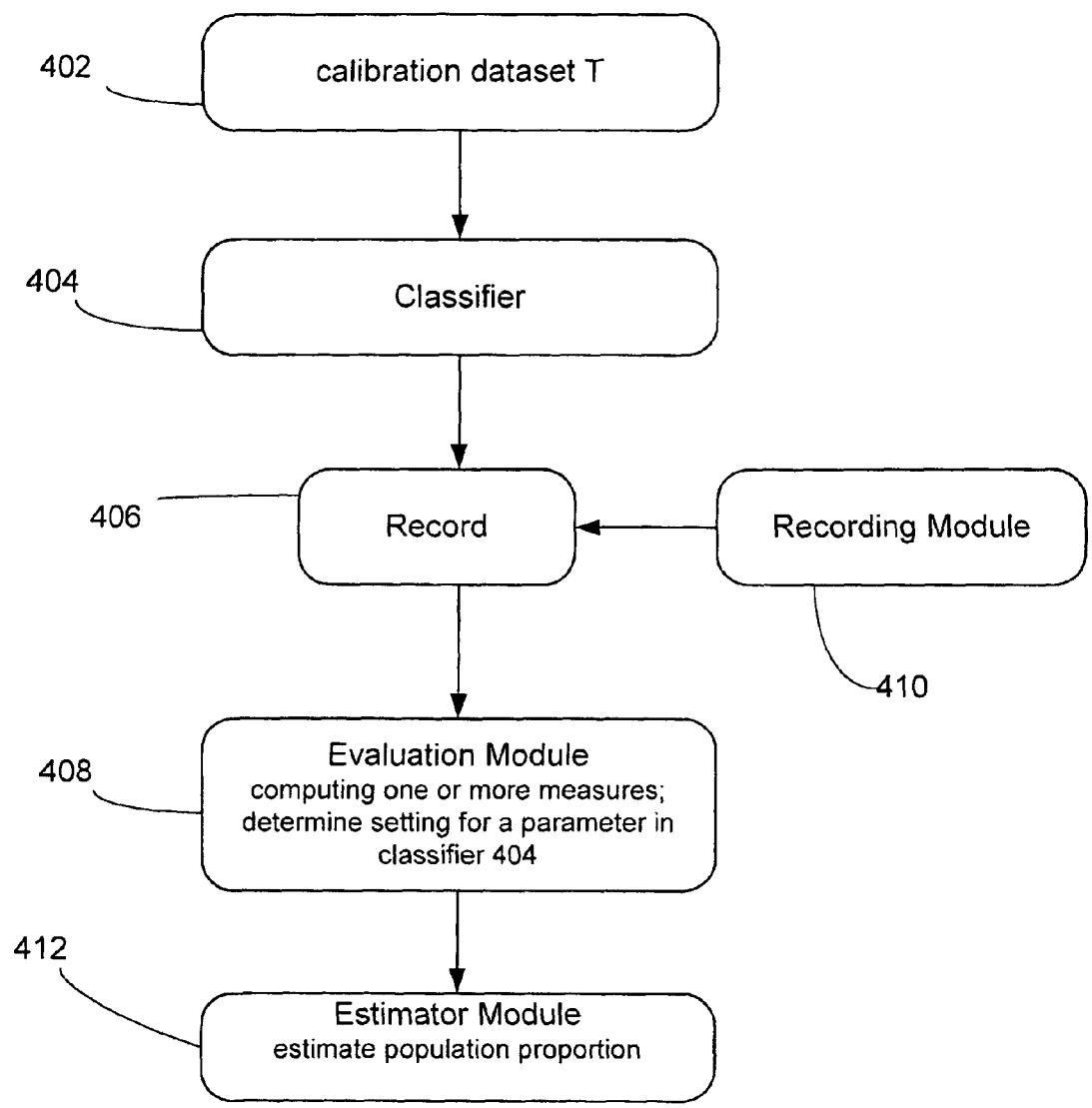
FIG. 4 is a schematic diagram showing the calculation of one or more measures using a calibration dataset according to an embodiment of the invention.

With reference to FIG. 4, given a calibration dataset 402, the recording module 410 records the score of the classifier 404 when applied to the items from the calibration dataset 402 in the record 406. The evaluation module 408 then orders the items in the record 406 according to classifier score, interpreting the items as an ROC curve. The evaluation module 408 then determines the setting of one or more parameters of the classifier 404, such as a threshold that determines the minimal score required for the classifier 404 to classify an item from the dataset 402 into the class C, according to the record. One manner in which such a parameter, for example said threshold, can be determined is by selecting a value between at least two successive items (as ordered by classifier score) in the record 406 such that the difference in classifier score between the two items in the record 406 is maximized. Given the determined setting of the one or more parameters of the classifier 404, the evaluation module 408 further computes the one or more measures of behavior of the classifier 404.

The second part of the extension involves variability among multiple ROC curves. In the case of cross-validation or sampled validation, for example when the test set is enormous, a better grasp on the variants of the ROC curve is possible. There will be such a curve for each of the validation test sets. In that case, there are likely to be sections where the curves closely overlap and sections where they diverge. It is best to select a threshold in the overlapping areas as there is more confidence in knowledge of the performance of the classifier 404 in those areas.

The embodiment provides improved accuracy in estimates of counts of items classified by a classifier in one or more classes by taking into account one or more measures of behavior of the classifier.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A classification count adjustment system comprising:
   a computer-readable storage medium to store:
      a count estimate produced by a classifier of a number of items in a dataset that have been classified into a class;
      one or more measures of behavior of the classifier indicating an ability of the classifier to classify the items into the class;
   a processor for computing an adjusted estimate based on the count estimate by the classifier and the one or more measures of behavior; and
   a reporting module to output the adjusted estimate for use in determining an amount of items that belong to the class.

2. A system as claimed in claim 1 wherein the one or more measures of behavior are any one of a precision, a recall, an accuracy, a true positive rate, a false positive rate, a true negative rate, a false negative rate, a confusion matrix, an information gain, a bi-normal separation, a lift, an F-measure or an area under a ROC curve.

3. A system as claimed in claim 1 wherein the processor is to compute the adjusted estimate by multiplying the count estimate by a measure of a precision of the classifier and a measure of a recall of the classifier.

4. A system as claimed in claim 1 wherein the processor is to compute the adjusted estimate by subtracting a product of a false positive rate of the classifier and the number of items in the dataset from the count estimate, and dividing a result of the subtraction by the difference between a true positive rate of the classifier and the false positive rate of the classifier.

5. A system as claimed in claim 1, further comprising a computer having the processor, wherein the classifier is executable in the computer, and wherein the classifier is to be applied to an item in the dataset to produce the count estimate.

6. A system as claimed in claim 1 wherein the processor is to further compute a complement adjusted estimate of the number of items in a complement of the class, and the reporting module is to further report the complement adjusted estimate.

7. A system as claimed in claim 1 further comprising a calibration dataset, a record containing an indication as to whether a particular item in the calibration dataset is classified into the class by the classifier, and an evaluation module for computing the one or more measures based on the calibration dataset and the record.

8. A system as claimed in claim 7 further comprising a recording module for computing the record by applying the classifier to the particular item.

9. A system as claimed in claim 7 wherein the evaluation module is to further compute a setting for a parameter in the classifier based on the record.

10. A system as claimed in claim 7 wherein the evaluation module is to perform cross-validation.

11. A system as claimed in claim 1 further comprising an estimator module for estimating a proportion of a population belonging to the class based on the adjusted estimate.

12. A system as claimed in claim 11 wherein the dataset is substantially a subset of the population and the proportion estimate is further based on the size of the population.

13. A system as claimed in claim 1 wherein the processor is to compute a bound on the adjusted estimate.

14. A system as claimed in claim 13 wherein the adjusted estimate has an upper bound determined by dividing the count estimate by a recall of the classifier, and wherein the adjusted estimate has a lower bound determined by multiplying the count estimate by a precision of the classifier.

15. A system as claimed in claim 13 wherein the processor is to compute the bound by assuming a change to the one or more measures of behavior.

16. A system as claimed in claim 1, wherein the computer-readable storage medium is to further store:
a second count estimate provided by a second classifier of a number of items in the dataset classified into a second class;
one or more measures of behavior of the second classifier indicating an ability of the second classifier to classify items into the second class;
wherein the processor is to further compute a second adjusted estimate based on the second count estimate and the one or more measures of behavior of the second classifier.

17. A system as claimed in claim 1, wherein the classifier comprises an automated classifier, and wherein the processor is to compute the adjusted estimate based on the count estimate by the automated classifier and the one or more measures of behavior of the automated classifier.

18. A system as claimed in claim 1, wherein the items of the dataset comprise one of (1) news articles and (2) representations of genes, the system further comprising the classifier being configured to be applied to the items to classify the items into the class, and wherein the output of the adjusted estimate is for use in determining an amount of the news articles or the representations of the genes in the class.

19. A method comprising:
providing a count estimate produced by a classifier of a number of items in a dataset classified into a class;
using one or more measures of behavior of the classifier to indicate an ability of the classifier to classify the items into the class;
computing, by a classification count adjustment computer system having a processor, an adjusted estimate based on the count estimate by the classifier and the one or more measures of behavior; and
outputting the adjusted estimate for use in determining an amount of items that belong to the class.

20. A method as claimed in claim 19 wherein the one or more measures of behavior are any one of a precision, a recall, an accuracy, a true positive rate, a false positive rate, a true negative rate, a false negative rate, a confusion matrix, an information gain, a bi-normal separation, a lift, an F-measure or an area under a ROC curve.

21. A method as claimed in claim 19 further comprising computing the adjusted estimate by multiplying the count estimate by a measure of a precision of the classifier and a measure of a recall of the classifier.

22. A method as claimed in claim 19 further comprising computing the adjusted estimate by subtracting a product of a false positive rate of the classifier and the number of items in the dataset from the count estimate, and dividing a result of the subtraction by the difference between a true positive rate of the classifier and the false positive rate.

23. A method as claimed in claim 19 further comprising applying the classifier to an item in the dataset to produce the count estimate.

24. A method as claimed in claim 19 wherein reporting the adjusted estimate is performed using a reporting module.

25. A method as claimed in claim 24 further comprising computing a complement adjusted estimate of a number of items in the complement of the class and reporting the complement adjusted estimate using the reporting module.

26. A method as claimed in claim 19 further comprising providing a calibration dataset and a record containing an indication as to whether a particular item in the calibration dataset is classified into the class by the classifier, and computing the one or more measures of behavior based on the calibration dataset and the record.

27. A method as claimed in claim 26 further comprising computing the record by applying the classifier to the particular item.

28. A method as claimed in claim 26 further comprising performing cross-validation.

29. A method as claimed in claim 26 further comprising computing a setting for a parameter in the classifier based on the record.

30. A method as claimed in claim 19 further comprising estimating a proportion of a population belonging to the class based on the adjusted estimate.

31. A method as claimed in claim 19 further comprising computing a bound on the adjusted estimate.

32. A method as claimed in claim 19 further comprising;
providing a second count estimate by a second classifier of a number of items in the dataset classified into a second class;
using one or more measures of behavior of the second classifier indicating an ability of the second classifier to classify the items into the second class;
computing a second adjusted estimate based on the second count estimate and the one or more measures of behavior of the second classifier.

33. A method as claimed in claim 19, wherein the classifier comprises an automated classifier, wherein computing the adjusted estimate comprises computing the adjusted estimate based on the count estimate by the automated classifier and the one or more measures of behavior of the automated classifier, and wherein outputting the adjusted estimate is for use in determining an amount of the news articles or the representations of the genes in the class.

34. The method as claimed in claim 19, wherein the items of the dataset comprise one of (1) news articles and (2) representations of genes, the method further comprising applying the classifier to the items to classify the items into the class.

35. A computer program embodied in a computer-readable storage medium, the computer program when executed to control a computer to:
obtain a count estimate by a classifier of a number of items in a dataset classified into a class;
use one or more measures of behavior of the classifier to indicate an ability of the classifier to classify the items into the class;
compute an adjusted estimate based on the count estimate by the classifier and the one or more measures of behavior; and
output the adjusted estimate for use in determining an amount of items that belong to the class.

* * * * *